United States Patent [19]
Hollis

[11] Patent Number: 5,402,831
[45] Date of Patent: Apr. 4, 1995

[54] RESTRAINT COUPLING ASSEMBLY FOR DOUBLE CONTAINMENT PIPE SYSTEM

[75] Inventor: Patrick Hollis, Wakefield, Mass.

[73] Assignee: Asahi/America, Inc., Mass.

[21] Appl. No.: 739,201

[22] Filed: Aug. 1, 1991

[51] Int. Cl.⁶ ............................................. F16L 9/18
[52] U.S. Cl. ................... 138/113; 138/109; 285/114; 285/115; 285/133.1
[58] Field of Search ............... 138/104, 111, 112, 113, 138/148, 150, 155, DIG. 3; 285/133.1, 138, 187, 423

[56] References Cited

U.S. PATENT DOCUMENTS

| | | | |
|---|---|---|---|
| 504,871 | 9/1893 | Forsyth | 285/138 |
| 3,899,007 | 8/1975 | Miller . | |
| 4,011,732 | 3/1977 | Doherty | 285/133.1 |
| 4,037,626 | 7/1977 | Roberts | 138/148 |
| 4,100,367 | 7/1978 | Netzel . | |
| 4,108,476 | 8/1978 | Krupp | 285/133.1 |
| 4,157,194 | 6/1979 | Takahashi | 138/113 |
| 4,408,657 | 10/1983 | Pugh | 138/112 |
| 4,573,527 | 3/1986 | McDonough . | |
| 4,644,780 | 2/1987 | Jeter | 138/104 |
| 4,688,319 | 8/1987 | Gross | 138/150 |
| 4,754,782 | 7/1988 | Grantham | 138/113 |
| 4,779,652 | 10/1988 | Sweeney . | |
| 4,786,088 | 11/1988 | Ziu . | |
| 4,886,305 | 1/1989 | Martin | 285/133.1 |
| 4,930,544 | 6/1990 | Ziu . | |
| 4,942,906 | 7/1990 | Igarashi | 138/DIG. 3 |
| 5,087,308 | 2/1992 | Wermelinger | 285/133.1 |

FOREIGN PATENT DOCUMENTS

| | | | |
|---|---|---|---|
| 282619 | 2/1966 | Australia | 285/133.1 |
| 672802 | 10/1963 | Canada | 285/138 |
| 2249449 | 4/1974 | Germany | 285/133.1 |
| 3204123 | 10/1982 | Germany | 285/133.1 |
| 794761 | 5/1958 | United Kingdom | 285/133.1 |
| 9004736 | 10/1989 | WIPO | 285/133.1 |

*Primary Examiner*—David A. Scherbel
*Assistant Examiner*—Terrence R. Till
*Attorney, Agent, or Firm*—Anthony J. Casella; Gerald E. Hespos

[57] ABSTRACT

A restraint coupling assembly is provided for a double containment pipe system having an inner carrier pipe formed from a first thermoplastic material and an outer containment pipe formed from a second thermoplastic material. The restraint coupling assembly includes a carrier component formed from the first thermoplastic material and having a carrier cylinder conforming to the diameter of the carrier pipe, and having a carrier flange extending rigidly outwardly from the carrier cylinder. The restraint coupling assembly further includes a pair of containment components formed from the second thermoplastic material. Each containment component includes a containment cylinder conforming to the diameter of the containment pipe. Each containment component further includes an inwardly extending containment flange having an aperture therein with the diameter of the aperture greater than the outer diameter of the carrier pipe. The containment component may be assembled around the carrier component such that the containment flanges restrain the carrier flange.

6 Claims, 1 Drawing Sheet

U.S. Patent
Apr. 4, 1995
5,402,831
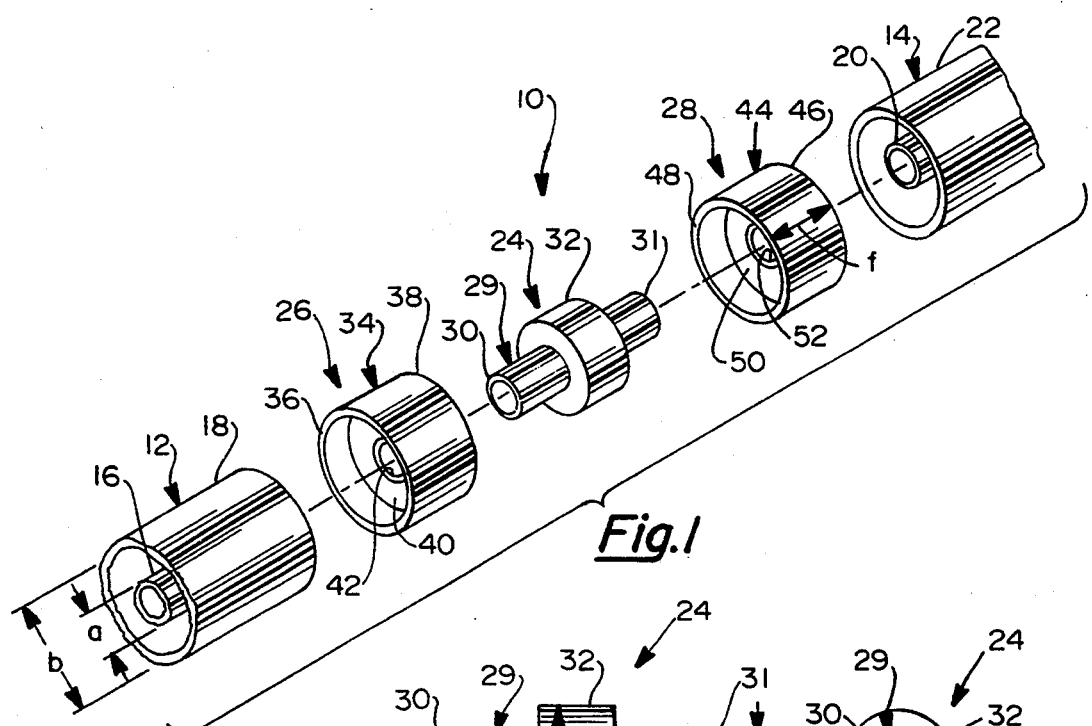
*Fig.1*
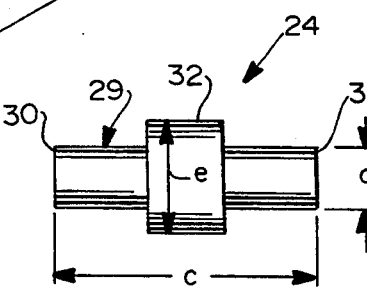
*Fig.2*   *Fig.3*
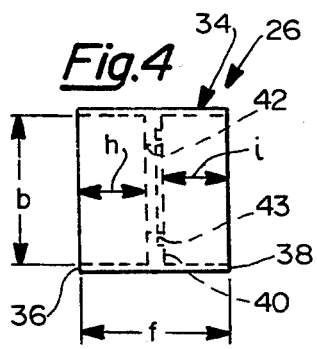
*Fig.4*
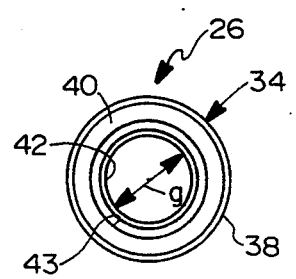
*Fig.5*
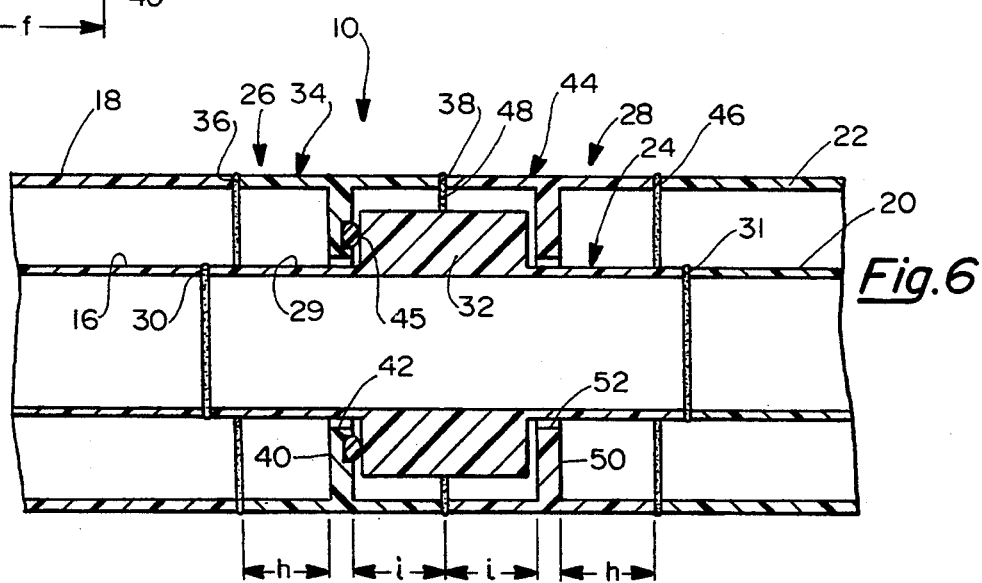
*Fig.6*

RESTRAINT COUPLING ASSEMBLY FOR DOUBLE CONTAINMENT PIPE SYSTEM

BACKGROUND OF THE INVENTION

The thermoplastics are known to exhibit high resistivity to corrosive chemicals. As a result, thermoplastic pipes are widely employed in chemical and petrochemical industries and in industries that use or produce highly corrosive materials as part of manufacturing processes. The particular thermoplastic material used in a pipe system will be selected in accordance with the anticipated range of chemicals to be carried through the pipes. For example, polyvinyl chloride (PVC) resists attack by most acids and strong alkalis as well as gasoline, kerosene, aliphatic alcohol, hydrocarbons and salt solutions. However, aromatic, chlorinated organic compounds and lacquer absolvents do have an effect on PVC. On the other hand, polyvinylidene fluoride (PVDF) has superior chemical resistance and is used in many situations where PVC would not be appropriate. PVDF also has a high molecular weight fluorocarbon that exhibits superior abrasion resistance and desireable dielectric properties and mechanical strength. PVDF maintains its desireable characteristics over a very broad temperature range, and is used in systems carrying chlorine, bromine and other halogens, most strong acids and bases, aliphatics, aromatics, alcohols and chlorinated solvents. PVDF, however, is not recommended for ketones or esters. Chlorinated polyvinyl chloride (CPVC) is a thermoplastic with characteristics similar to PVC, but with a working temperature range that is higher than PVC. Another thermoplastic used in pipe systems is polypropylene (PP) which possesses excellent chemical resistance to many acids, alkalies and organic solvents. However, PP is not recommended for use with chlorinated hydrocarbons and aromatics. Still other thermoplastic materials used in piping systems include acrylonitrile butadiene styrene (ABS) and glass-filled polypropylene (PPG).

The components of thermoplastic pipe systems are fused to one another by an appropriate application of heat and pressure. The heat causes the thermoplastic to soften temporarily, and the softened edge or surface regions are then urged into direct abutting contact. The abutting surfaces or edges then will harden and integrally join with one another to provide a leak proof connection. However, one type of thermoplastic material generally will not fuse to another type of thermoplastic material. Consequently engineers typically have been required to select a particular thermoplastic material based upon the nature of the chemicals to be carried, and then will design an entire system or subsystem with the selected thermoplastic.

It should be noted that the costs of different types of thermoplastic materials vary significantly. Thus, a pipe system formed from CPVC or PVDF may cost more than a corresponding system formed from PVC.

Thermoplastic pipe systems are widely employed to carry very hazardous chemicals. A leak from a pipe system carrying such chemicals could be environmentally catastrophic, and could cause at least local health problems. To avoid this potential, double containment thermoplastic pipe systems have been developed and are widely employed. The double containment pipe system includes at least one inner carrier pipe disposed within an outer containment pipe. The outer containment pipe functions as a fail safe which at lest temporarily contains any hazardous material that may leak from an inner carrier pipe. A double containment pipe system may be employed with sensing means which is operative to identify the existence of a fluid within the space between the inner carrier pipes and the outer containment pipe. For example, the sensor may be a sensor wire that generates a signal in response to contact by a fluid. The sensor wire may extend longitudinally in the space between the inner carrier pipe and the outer containment pipe. Other systems employing different types of sensors also are known.

An extremely effective and efficient double containment pipe system is shown in U.S. Pat. No. 4,786,088 which issued to Christopher G. Ziu on Nov. 22, 1988 and which is assigned to the assignee of the subject invention. A divisional of the above-identified U.S. Pat. No. 4,786,088 resulted in U.S. Pat. No. 4,930,544 which issued on Jun. 5, 1990 and also is assigned to the assignee of the subject invention. The double containment thermoplastic pipe assembly shown in these two patents includes an inner carrier pipe supported generally concentrically within an outer containment pipe by a plurality of supports. U.S. Pat. No. 4,930,544 is specifically directed to a restraint coupling for use in such a system. In particular, the inner carrier pipe may carry very hot fluids that will cause the pipe to periodically expand. The expansion of the inner carrier pipe over a great length could cause the inner carrier pipe to buckle into the outer containment pipe or to expand longitudinally into the outer containment pipe at an elbow or other such fitting. The restraint coupling disclosed in U.S. Pat. No. 4,930,544 prevents that problem by rigidly fixing the inner carrier pipe to the outer containment pipe at selected locations along their lengths. In particular, the restraint coupling of U.S. Pat. No. 4,930,544 is unitarily formed from a thermoplastic material and includes a generally cylindrical containment portion defining a diameter substantially equal to the diameter of the containment pipe and a generally cylindrical carrier portion defining a diameter substantially equal to the diameter of the carrier pipe. A connecting portion extends rigidly between the containment and carrier portions of the restraint coupling. The containment and carrier portions of the restraint coupling shown in U.S. Pat. No. 4,930,544 define longer axial lengths than the connecting portion. Thus, the carrier portion of the restraint coupling can be butt fused in end-to-end relationship to a carrier pipe of the pipe system, and the containment portion of the restraint coupling can be butt fused in end-to-end relationship with the containment pipe of the pipe system.

Although the restraint coupling and the overall double containment piping system shown in U.S. Pat. No. 4,930,544 has performed exceptionally well and has received very substantial commercial acceptance, the restraint coupling is substantially limited to double containment pipe systems where the inner carrier pipe and the outer containment pipe are formed from the same type of thermoplastic. In particular, the restraint coupling shown in U.S. Pat. No. 4,930,544 is unitarily formed and hence includes the same thermoplastic material on the carrier and containment portions thereof. This thermoplastic material must be compatible with the thermoplastic of both the inner carrier pipe and the outer containment pipe of the pipe system, thereby requiring the inner and outer pipes of the double containment pipe system to be formed from the same thermoplastic as well. As noted above, however, there are very substantial cost differences for different types of thermoplastic materials. For example, a fairly costly inner carrier pipe formed from a PVDF thermoplastic may be required in view of the high temperature fluids to be carried through the pipe. The prior art system necessarily would require the outer containment pipe to be formed from the same fairly costly PVDF. However, any leakage that may occur would cool rapidly, and hence the more costly PVDF thermoplastic might not necessarily be required for efficient containment. Nevertheless, the more costly PVDF would have to be employed to achieve compatibility with the restraint coupling.

In view of the above, it is an object of the subject invention to provide a restraint coupling that enables an inner carrier pipe to be formed from a different material than the outer containment pipe.

It is another object of the subject invention to provide a restraint coupling that enables an economically more efficient double containment pipe system.

Still a further object of the subject invention is to provide a restraint coupling formed from a thermoplastic material for welding to a less expensive outer containment pipe but for restraining an inner carrier pipe formed from a more expensive material.

SUMMARY OF THE INVENTION

The subject invention is directed to a restraint coupling assembly for a double containment pipe system having a containment pipe surrounding at least one carrier pipe. The restraint coupling assembly includes an inner carrier component and a plurality of outer containment components. The carrier component may be unitarily formed from a thermoplastic material compatible with the inner carrier pipe of a double containment pipe system. The carrier component includes at least one carrier cylinder having a diameter substantially equal to the diameter of the carrier pipe of the double containment pipe system. The carrier component further includes a rigid carrier flange extending outwardly from the carrier cylinder. The carrier flange defines an axial length shorter than the carrier cylinder and defines an external diameter smaller than the inner diameter of the containment pipe of the double containment pipe system.

The containment components of the restraint coupling assembly each are formed from a thermoplastic material compatible with the thermoplastic of the containment pipe used in the double containment pipe system. Each containment component includes a containment cylinder defining a diameter substantially equal to the diameter of the containment pipe in the double containment pipe system. A containment flange extends rigidly inwardly from the containment cylinder at a location intermediate the opposed ends of the containment cylinder. The containment cylinder may project axially from the containment flange by a distance equal to approximately one half the axially length of the carrier flange. The containment flange is provided with a central aperture defining a diameter equal to or larger than the outer diameter of the carrier pipe in the double containment pipe system, and hence equal to or larger than the diameter of the carrier cylinder on the carrier component. Thus, either a section of the carrier pipe or the carrier cylinder of the carrier component may be slidably advanced into and through the central aperture in the containment flange. However, the diameter of the aperture in the containment flange is less than the diameter of the carrier flange. The containment flange may be characterized by an annular groove at least in one face thereof for receiving an O-ring or other such sealing means. The O-ring or other such sealing means would be employed in situations where it is desireable to contain any leak that might occur.

The restraint coupling assembly may be assembled by slidable disposing containment components over opposed axially ends of the carrier component. More particularly, the containment flanges of the two containment components will be advanced over the carrier cylinder such that the opposed axially ends of the carrier cylinder advance respectively through the central apertures in the containment flanges of the respective containment components. Opposed axial ends of the containment cylinders will then be butt fused into secure abutting end-to-end connection with one another. The dimensions of the respective containment components are such that the containment flanges will be substantially adjacent to opposed axial ends of the carrier flange.

This assembled restraint coupling may be incorporated into a double containment pipe system by first butt fusing the carrier cylinder in end-to-end relationship with a pair of opposed axially aligned carrier pipes. This butt fusion is possible because the carrier component of the restraint coupling assembly is formed from a thermoplastic material compatible with the carrier pipe of the double containment pipe system. The containment cylinders may then be butt fused in end-to-end relationship with a pair of axially aligned containment pipes. As noted above, the containment components are formed from a thermoplastic material compatible with the containment pipes.

The restraint coupling assembly will positively restrain the carrier pipes relative to the containment pipes in response to differential thermal expansion. Additionally, the containment pipes and the containment components of the subject restraint coupling assembly may be formed from a thermoplastic material that is substantially less expensive then the thermoplastic material used on the carrier pipe and the carrier component. In particular, the carrier pipe and the carrier component of the restraint coupling assembly may be formed from PVDF, in view of the high temperature fluids that may be flowing through the carrier pipe. However, the containment pipes and the containment components of the restraint coupling assembly may be formed from a less expensive thermoplastic, in view of the lower temperatures of any fluids that may leak into the space between the carrier and containment pipes. For example, the containment pipe and the containment components of the restraint coupling assembly may be formed from a PVC. The particular thermoplastic employed in the carrier component and the containment components were selected in accordance with system needs and may be selected from available thermoplastics, such as PVDF, PVC, PEEK, CPVC or PP.

BRIEF DESCRIPTION OF THE DRAWINGS

FIG. 1 is an exploded perspective view of the restraint coupling assembly of the subject invention in proximity to components of a double containment pipe system.

FIG. 2 is a top plan view of the carrier component of the restraint coupling assembly.

FIG. 3 is an end elevational view of the carrier components depicted in FIG. 2.

FIG. 4 is a top plan view of a container component of the subject restraint coupling assembly.

FIG. 5 is an end elevational view of the containment component depicted in FIG. 4.

FIG. 6 is a cross-sectional view of a double containment pipe system incorporating the subject restraint coupling assembly.

DETAILED DESCRIPTION OF THE PREFERRED EMBODIMENT

A restraint coupling assembly in accordance with the subject invention is identified generally by the numeral 10 in FIGS. 1 and 6. The restraint coupling assembly 10 is intended for use with first and second generally axially aligned double containment pipe assemblies 12 and 14 respectively. The first double containment pipe assembly 12 includes a first carrier pipe 16 having an outside diameter "a" and being formed from a first thermoplastic material. The first double containment pipe assembly 12 further includes a first containment pipe 18 formed from a second thermoplastic material and defining an inside diameter "b". The second double containment pipe assembly 14 includes a second carrier pipe 20 which also is formed from the first thermoplastic material and a second containment pipe 22 which is formed from the second thermoplastic material. The first and second carrier pipes 16 and 20 are supported generally concentrically within the respective first and second containment pipes 18 and 22. However, in other embodiments a plurality of carrier pipes may be supported within each containment pipe.

The restraint coupling assembly 10 includes a carrier component 24 and first and second containment components 26 and 28 respectively. The carrier component 24 of the restraint coupling assembly 10 is formed from a thermoplastic material which is identical to or compatible with the first thermoplastic material from which the first and second carrier pipes 16 and 20 are formed. Thus, the carrier component 24 of the restraint coupling assembly 10 can be butt fused to the carrier pipes 16 and 20 as explained further herein.

The carrier component 24 includes an elongated carrier cylinder 29 having an outside diameter "a" which is substantially equal to the outside diameter of the first and second carrier pipes 16 and 20 respectively. The carrier cylinder 29 has opposed ends 30 and 31 defining an axially length "c" as illustrated in FIG. 2. The carrier component 24 is further characterized by a carrier flange 32 defining an axially length "d" which is substantially less than the axially length "c" of the carrier cylinder 29. More particularly, the carrier flange 32 is disposed approximately centrally along the length of the carrier cylinder 29. The carrier flange 32 further defines an outer diameter "e" which is less than the inner diameter "b" of the first and second containment pipes 18 and 22 respectively. Preferably, the carrier component 24 is unitarily molded from the first thermoplastic material. However, a carrier component that is machined or fused into a single rigid integral structure may be employed. It is important, however, that the carrier flange 32 be substantially inflexible and substantially rigid with respect to the carrier cylinder 29.

The first and second containment components 26 and 28 may be substantially identical to one another. The first containment component 26 includes a containment cylinder 34 having opposed ends 36 and 38 defining an axially length "f" and further having an inner diameter "b" substantially equal to the inner diameter of the first and second containment pipes 18 and 22 respectively. The containment cylinder 34 is formed from a thermoplastic material identical to or compatible with the thermoplastic of the first and second containment pipes 18 and 22 respectively. Additionally, the containment cylinder 34 is formed to define a radially thickness substantially equal to the radial thickness of the first and second containment pipes 18 and 22 respectively. The first containment component 26 is further characterized by an inwardly extending containment flange 40. The containment flange 40 is characterized by a central aperture 42 extending therethrough and defining a diameter "g" which is greater than the outer diameter "a" of the carrier cylinder 29, but smaller than the diameter "e" of the carrier flange 32. The containment flange 40 is spaced from the first end 36 of the containment cylinder 34 by a distance "h" and from the second end 38 of the containment cylinder 34 by distance "i". The side of the containment flange 40 facing the second end 38 of the containment cylinder 34 is characterized by an annular groove 43 for receiving an O-ring 45 as explained herein.

The containment component 28 is substantially identical to the containment component 26. In particular, the containment component 28 includes a containment cylinder 44 defining a diameter substantially equal to the diameter "b" of the containment cylinder 34 of the containment component 26. The containment component 28 is further characterized by opposed first and second axially ends 46 and 48 defining an axially length "f" substantially equal to the length of the containment component 34 described above. A containment flange 50 extends rigidly inwardly from the containment cylinder 44 at a location intermediate the opposed ends 46 and 48 thereof. As shown in FIG. 6, the containment flange 50 of the containment component 28 is spaced from the first end by a distance "h" and from the second end 48 by a distance "i". The containment flange 50 defines an axially thickness sufficient to prevent significant movement of the containment flange 50 relative to the containment cylinder 44. The containment flange 50 is further characterized by a central aperture 52 having a diameter "g" substantially equal to the diameter of the aperture 42 in the first containment component 26. As noted above, the diameter "g" of the aperture 52 is greater than the diameter "a" of the carrier cylinder 29 on the carrier component 24, but is smaller than the diameter "e" of the carrier flange 32.

With reference to FIG. 6, the containment flange 50 is not provided with a groove for retaining an O-ring. However, such a groove and a corresponding O-ring may be provided in some system applications.

The restraint coupling assembly 10 may be efficiently employed in double containment pipe systems having inner carrier pipes 16 and 20 formed from a first thermoplastic material and outer containment pipes 18 and 22 formed from a second thermoplastic material. With reference to FIGS. 1 and 6, the first and second containment components 26 and 28 may be assembled and secured around the carrier component 24. In particular, the central aperture 42 in the containment flange 40 of the first containment component 26 may be slid over the first axially end 30 of the carrier cylinder 29 and advanced substantially into contact with the carrier flange 32. Similarly, the aperture 52 in the containment flange 50 of the second containment component 28 may be slidably advanced over the second end 31 of the carrier cylinder 29 such that the containment flange 50 is substantially adjacent the carrier flange 32. The second end 38 of the containment cylinder 34 on the first containment component 26 then is butt fused to the second end 48 of the containment cylinder 44 on the second containment component 28. This secure end-to-end engagement of the containment cylinders 34 and 44 substantially captures the carrier flange 32 and limits relative movement between the carrier component 24 and the containment components 26 and 28. In the embodiment depicted in FIG. 6, an O-ring 45 is disposed in the groove 43 to prevent fluid flow between the carrier component 24 and the containment component 26. The O-ring 45 may not be necessary in embodiments where fluid sensing rather than containment is an object of the system.

The assembly of the carrier component 24 and the containment components 26 and 28 may then be connected appropriately to the double containment pipe system. More particularly, the first end 30 of the carrier cylinder 29 may be butt fused to the end of the first carrier pipe 16. This butt fusion can be carried efficiently and effectively due to the compatibility of the thermoplastic material from which the carrier component 24 and the first carrier pipe 16 are made. The first end 36 of the containment cylinder 34 may then be butt fused to the end of the first containment pipe 18. This butt fusion can be carried out efficiently and effectively since the containment component 26 and the first containment pipe 18 are made of compatible thermoplastic materials, even though those thermoplastic materials may be incompatible with the carrier pipe 16 and the carrier component 24.

In a similar manner, the second carrier pipe 20 may be butt fused to the second end 31 of the carrier cylinder 29. Once again, the butt fusion can be effected due to the identity or compatibility of the thermoplastic materials of the carrier component 24 and the second carrier pipe 20. Finally, the end of the second containment pipe 22 can be butt fused to the end 46 of the containment cylinder 44 on the second containment component. As noted above, this fusion can be effected due to the compatibility of the thermoplastic materials used for the second containment pipe 14 and the second containment component 28.

With reference to FIG. 6, the restraint coupling assembly 10 will control differential thermal expansion of the inner carrier pipes 16 and 20 relative to the outer containment pipes 18 and 22. In this regard the carrier flange 32 of the carrier component 24 will be positively restrained between the containment flanges 40 and 50 of the respective containment components 26 and 28. Restraint coupling assemblies 10 may be spaced along the length of a double containment pipe system as appropriate to localize differential expansion and prevent any major differential expansion that could structurally damage the pipe system.

While the invention has been described with respect to a preferred embodiment, various changes can be made without departing from the scope of the invention as defined by the appended claims.

I claim:

1. A restraint coupling assembly for a double containment pipe system having a cylindrical inner carrier pipe of a first diameter formed from a first thermoplastic material and a cylindrical outer containment pipe of a second diameter formed from a second thermoplastic material, said restraint coupling assembly comprising:

a carrier component unitarily formed from the first thermoplastic material and having an elongated carrier cylinder defining a selected length and a diameter substantially conforming to the diameter of the carrier pipe and a carrier flange disposed intermediate the length of the carrier cylinder and extending radially outwardly therefrom; and a pair of containment components, each said containment component being unitarily formed from the second thermoplastic material and comprising a containment cylinder having a diameter substantially conforming to the diameter of the containment pipe and having opposed axially ends, a containment flange extending inwardly from each said containment cylinder at locations thereon intermediate the respective opposed axially ends, the containment flange of each containment component being characterized by an aperture extending therethrough and defining a diameter less than the diameter of the carrier flange but greater than the diameter of the carrier pipe, the containment cylinders of the respective containment components being butt fused in end-to-end relationship such that the carrier flange is restrained intermediate the containment flanges, the fused containment cylinders defining an axial length less than the length of the carrier cylinder such that the carrier cylinder extends axially beyond the fused containment cylinders, whereby the carrier cylinder and the containment cylinders are butt fusable to the carrier and containment pipes respectively such that the restraint coupling assembly restrains the carrier pipe relative to the containment pipe.

2. A restraint coupling assembly as in claim 1 further comprising at least one sealing means disposed intermediate the carrier flange and at least one of said containment flanges.

3. A restraint coupling assembly as in claim 2, wherein the containment flange of at least one containment component is formed with an annular groove facing the carrier flange of the carrier component, the sealing means comprising an O-ring disposed in the groove and in sealing engagement with the carrier flange.

4. A restraint coupling assembly as in claim 1, wherein the carrier component is formed from PVDF.

5. A restraint coupling assembly as in claim 1, wherein the containment components are formed from PVC.

6. A restraint coupling assembly as in claim 1, wherein the carrier component is formed from a thermoplastic material exhibiting resistance to select chemicals at a temperature range higher than the temperature range for the thermoplastic material from which the containment components are formed.

* * * * *